(12) United States Patent
Batchelder

(10) Patent No.: US 12,544,906 B2
(45) Date of Patent: Feb. 10, 2026

(54) EXTERNAL TOOL AND MATERIAL STORAGE DEVICE

(71) Applicant: SMARTAUGER, INC., Wadsworth, OH (US)

(72) Inventor: Kyle Thomas Batchelder, Spring Creek, NV (US)

(73) Assignee: SmartAuger, Inc., Wadsworth, OH (US)

( * ) Notice: Subject to any disclaimer, the term of this patent is extended or adjusted under 35 U.S.C. 154(b) by 0 days.

(21) Appl. No.: 18/621,188

(22) Filed: Mar. 29, 2024

(65) Prior Publication Data

US 2024/0359312 A1 Oct. 31, 2024

Related U.S. Application Data

(60) Provisional application No. 63/461,872, filed on Apr. 25, 2023.

(51) Int. Cl.
*B25H 3/04* (2006.01)

(52) U.S. Cl.
CPC ..................... *B25H 3/04* (2013.01)

(58) Field of Classification Search
CPC . B25H 3/04; B25H 5/00; B60P 7/0823; B66F 11/044; B66F 11/04
See application file for complete search history.

(56) References Cited

U.S. PATENT DOCUMENTS

| | | | |
|---|---|---|---|
| D376,454 S * | 12/1996 | Fierek | D32/54 |
| 5,704,496 A * | 1/1998 | Latta | B62B 1/262 |
| | | | 211/70.6 |
| 5,878,837 A | 3/1999 | Kistner | |
| 6,244,486 B1 | 6/2001 | Holland et al. | |
| 6,371,346 B1 | 4/2002 | Sharma | |
| 6,637,077 B2 * | 10/2003 | Doty | B60P 7/0823 |
| | | | 24/298 |
| 7,103,943 B2 * | 9/2006 | Lambert | A01K 27/001 |
| | | | 24/298 |
| 7,967,109 B2 * | 6/2011 | Petzl | A62B 35/0037 |
| | | | 224/660 |
| 9,249,003 B2 | 2/2016 | Reeves | |
| 9,796,339 B2 | 10/2017 | Hanley et al. | |
| 10,016,051 B2 | 7/2018 | Hintze | |
| 10,136,712 B2 | 11/2018 | Taylor-Phillips | |
| 10,597,191 B2 | 3/2020 | Seiders et al. | |

(Continued)

OTHER PUBLICATIONS

NPL-1: ProsourceFit Multi-Loop Stretching Strap . . . , Web page https://www.amazon.com/ProsourceFit-Multi-Loop-Stretching-Gymnastics-Flexibility/dp/B07V9ZS8PF/ref=asc_df_B07V9ZS8PF/?tag=hyprod-20&linkCode=df0&hvadid=642175587800&hvpos=&hvnetw=g&hvrand=3436034272151656794&hvpone=&hvptwo=&hvqmt=&hvdev=c&hvdvcmdl=&hvlocint=&hvlocphy=9015313&hvtargid=pla-1968472536648&mcid=ae357269144a3daf9f49d28db4cc73bd&th=1 retrieved from the Internet on Feb. 10, 2024.

(Continued)

*Primary Examiner* — William L Miller
(74) *Attorney, Agent, or Firm* — Mintz Levin Cohn Ferris Glovsky and Popeo, P.C.

(57) ABSTRACT

A tool carrier rigging is provided. The tool carrier has a base strap and a loop strap joined to the base strap at a plurality of joints. The joints are spaced apart at a first regular interval. The tool carrier has a carrier loop having a section of the base strap and a section of the loop strap joined at two joints spaced apart according to the first regular interval. A tensioning closure is provided to reversibly join a first end of the tool carrier and a second end of the tool carrier.

16 Claims, 7 Drawing Sheets

(56) References Cited

U.S. PATENT DOCUMENTS

| | | | |
|---|---|---|---|
| 11,299,318 B2 | 4/2022 | Seiders et al. | |
| D991,683 S * | 7/2023 | Loudenslager | D3/327 |
| 12,194,613 B2 * | 1/2025 | Nair | B25H 3/04 |
| 2003/0227148 A1 | 12/2003 | Shipman | |
| 2005/0067361 A1 | 3/2005 | Waymire | |
| 2007/0039986 A1 * | 2/2007 | Tomasi | B62B 1/20 |
| | | | 224/563 |
| 2007/0095873 A1 * | 5/2007 | Petzl | A62B 35/0025 |
| | | | 224/660 |
| 2017/0313476 A1 | 11/2017 | Moreau | |
| 2018/0244432 A1 | 8/2018 | Seiders et al. | |
| 2019/0126461 A1 * | 5/2019 | Mefferd | B25H 3/04 |
| 2019/0255695 A1 | 8/2019 | Moreau et al. | |
| 2019/0291264 A1 * | 9/2019 | Mefferd | B25H 3/003 |
| 2021/0094461 A1 * | 4/2021 | Miller | B60P 7/135 |
| 2023/0100084 A1 * | 3/2023 | Hargis | B66F 13/00 |
| | | | 211/94.01 |
| 2023/0102378 A1 * | 3/2023 | Hargis | B25H 3/02 |
| | | | 211/70.6 |
| 2023/0144403 A1 * | 5/2023 | Coffey | B25H 3/04 |
| | | | 206/373 |
| 2023/0241760 A1 * | 8/2023 | Nair | B25H 3/04 |
| | | | 248/220.1 |
| 2023/0270266 A1 * | 8/2023 | Paprocki | A47F 5/10 |
| | | | 211/94.01 |
| 2024/0100685 A1 * | 3/2024 | Mislich | B25H 3/04 |

OTHER PUBLICATIONS

NPL-2: Chainsaw Scabbard with Built in Hand Saw Holder in Red, web page https://safetreeproducts.com/chainsaw-scabbard-with-built-in-hand-saw-holder/ retrieved from the Internet on Feb. 10, 2024.

NPL-3: Stick Saw and Pole Saw Holder, web page https://safetreeproducts.com/products-3/stick-saw-and-pole-saw-holder/ retrieved from the Internet on Feb. 10, 2024.

* cited by examiner

EXTERNAL TOOL AND MATERIAL STORAGE DEVICE

This application claims the benefit of provisional U.S. patent application Ser. No. 63/461,872 filed on Apr. 25, 2023, which is incorporated herein by reference in its entirety.

I. BACKGROUND OF THE INVENTION

A. Field of Invention

The invention generally relates to the field of tool carriers.

B. Description of the Related Art

Aerial man baskets are regularly used by utility companies and arborists to conduct work high above the ground. It is known that these baskets have limited working space. Meanwhile, workers need to not only occupy the basket, but also carry bulky tools and materials with them to conduct their work. Conventional external storage devices are bulky bags, buckets, or trays that expand the exterior profile of the basket, create a hazard of snagging on power lines, or otherwise making it more difficult to fit the basket into a tight work environment. Moreover, the storage provided by conventional devices is limited to the localized placement of the device, rather than providing storage along one or more whole sides of the basket.

What is missing in the art is a tool carrier that provides storage along one or more entire sides of the basket while maintaining a low profile. Some embodiments of the present invention may provide one or more benefits or advantages over the prior art.

II. SUMMARY OF THE INVENTION

Some embodiments may relate to tool carriers for use on aerial man baskets, scaffolding, suspended scaffolds or swing stages, and similar elevated structures where tools are used and must be secured to protect persons below from harm. Embodiments of the invention provide a tool carrier rigging that mounts to the upper rim of e.g. a man basket at a plurality of points using mounting structures like S-hooks. The mounting structures prevent the tool carrier from sagging due to the weight of attached tools. In addition to attaching to the rim of a man basket, the tool carrier also wraps around the basket and the ends connect with a closure and/or tensioning device. Tension can be applied to the tool carrier to minimize the carrier's motion relative to the basket. The tool carrier provides workers with a means for attaching tools with mounting structures like carabineers, quick-draw carabineers, and rigging ropes.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof, wherein like reference numerals indicate like structure, and wherein.

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Terms of degree, terms of approximation, and/or subjective terms may be used herein to describe certain features or elements of the invention. In each case sufficient disclosure is provided to inform the person having ordinary skill in the art in accordance with the written description requirement and the definiteness requirement of 35 U.S.C. 112.

Figure 1:
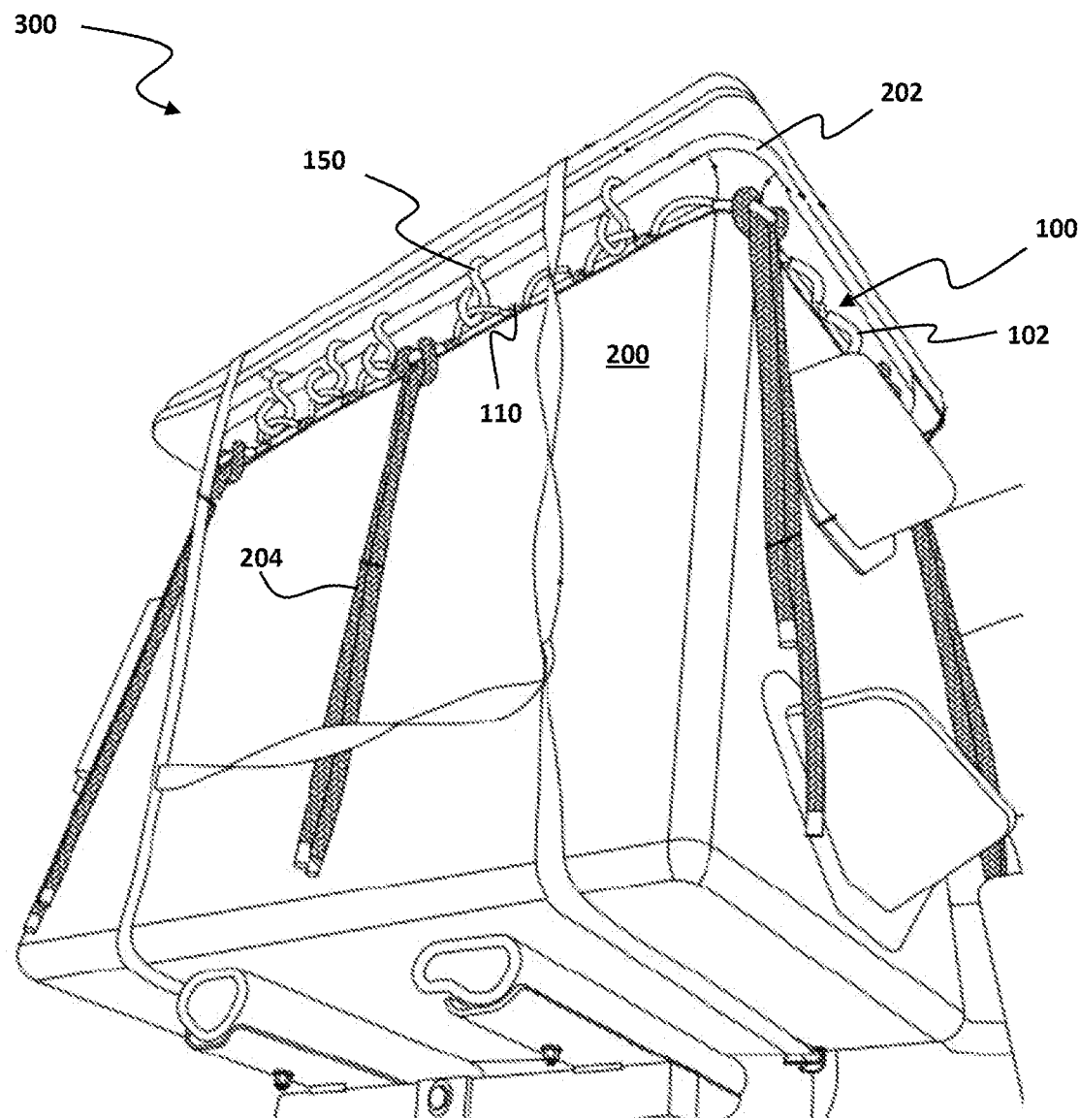
FIG. 1 is a perspective view of an embodiment installed on an aerial man basket, looking upward from below the basket.

Referring now to the drawings wherein the showings are for purposes of illustrating embodiments of the invention only and not for purposes of limiting the same, FIG. 1 is a perspective view showing a typical use case 300 of an embodiment 100. The embodiment is shown mounted to the upper edge or rim 202 an aerial man basket 200 with hooks 150. The hooks 150 can engage the carrier loops 102 along the length of the embodiment 100 as shown in FIG. 1. However, a small secondary loop, referred to herein as a mounting loop 110, is also provided for engaging a mounting structure such as the illustrated hook 150 or other known mounting structures. Although the hooks 150 illustrated in FIG. 1 are shown engaging carrier loops 102, the mounting loops 110 may be used to engage the hooks 150 instead of or in addition to the carrier loops 102, as this would free the carrier loops for connecting tools or other equipment. A plurality of ropes 204 are also shown looped around carrier loops 102 of the embodiment 100 and hanging down the side of the man basket 200.

Figure 2:
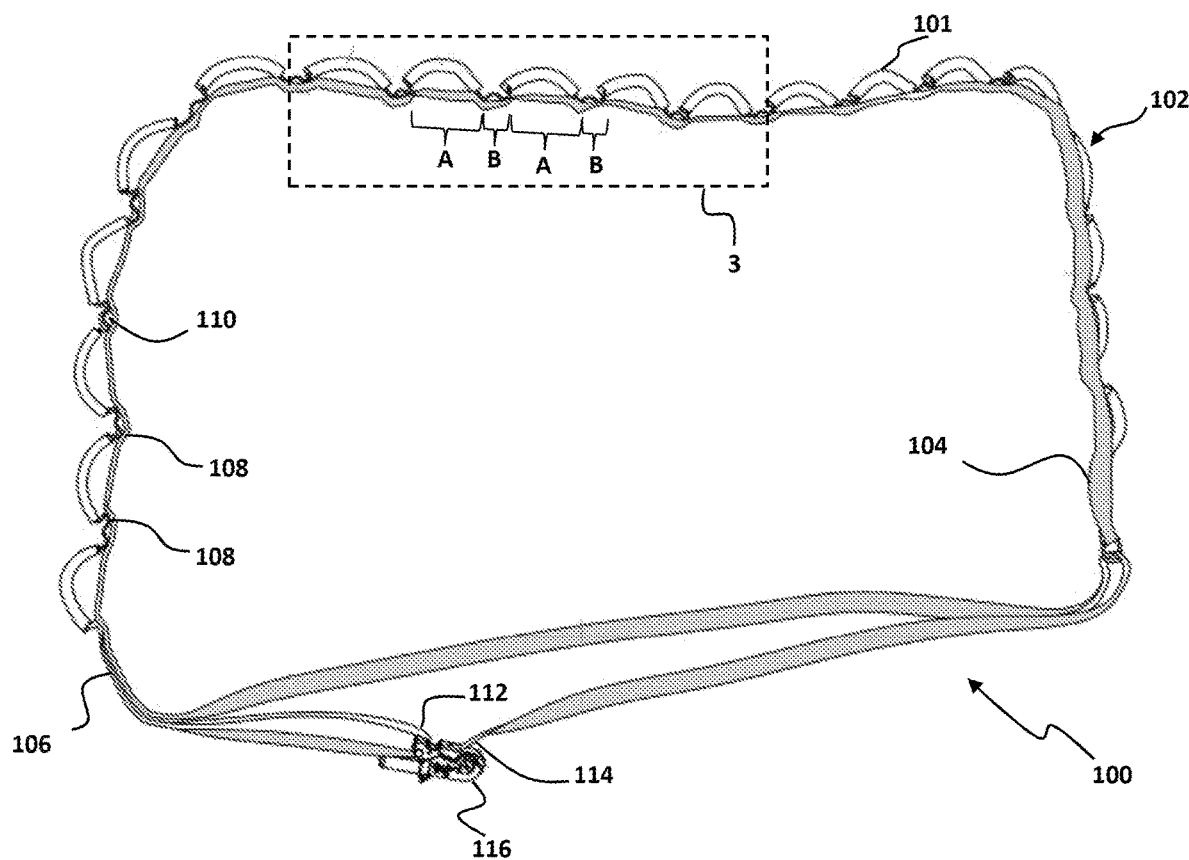
FIG. 2 is a view of the embodiment of FIG. 1 without the man basket.

FIG. 2 shows the full embodiment 100 of FIG. 1 without the aerial man basket. The tool carrier 100 is arranged roughly in a rectangular pattern, mimicking its shape when installed on an aerial man basket 200. Carrier loops 102 and mounting loops 110 are shown in an alternating pattern on three sides of the rectangle. A fourth side comprises a closure and tensioning closure 116, or more specifically, a ratcheting closure 116. Although a ratcheting closure 116 is shown, the invention is not limited to such structures. For example, the first end 112 of the tool carrier and the second end 114 of the tool carrier can be joined by any of a wide variety of known buckles. Some buckles may have male and female components that snap together, and the buckle may have an integrated tensioner. Alternatively, the buckle may cooperate with a separate tensioning structure such as a slide bar. In embodiments where relatively high tensions are not required, as compared to a ratcheting tensioner, conventional plastic buckles and slide bars can be used to close and apply tension to the tool carrier rigging. Tensioners and buckles are well known in the art, and can be selected by the person of ordinary skill as a matter of design choice without undue experimentation.

With continuing reference to FIG. 2, the embodiment comprises a base strap 104 and a loop strap 106, either or both of which may be composed of conventional woven nylon webbing. The loop strap is advantageously longer than the base strap so that the extra slack can form an open shape or are suitable for receiving a tool or a tool attachment means such as a carabineer. The carrier loops 102 and mounting loops 110 are formed by joining the loop strap 106 to the base strap 104 according to known means. For example, and without limitation, well-known means for joining woven nylon strapping include sewing, riveting, adhesive bonding, and welding. Any such known means may be used alone or in combination to form joints 108 between the loop strap and base strap. Joints 108 spaced apart by interval A comprise the carrier loops 102, while joints spaced apart by interval B comprise mounting loops 110. The pattern illustrated in FIG. 2 is A-B-A-B; however, other suitable patterns are A-A-A-A indicating a lack of mounting loops, and A-B-B-A indicating double mounting loops. Double mounting loops may be advantageous for bearing particularly heavy loads. Conversely, fewer mounting loops can be used in light duty embodiments. The person having ordinary skill in the art will be readily able to select a loop pattern as a matter of design choice and without undue experimentation.

While the embodiments discussed herein are set forth in terms of nylon straps, the invention is not limited to straps made of nylon. Other suitable materials include woven natural and/or synthetic fibers, or even leather. The person having ordinary skill in the art will be readily able to select suitable materials as a matter of design choice and without undue experimentation. Furthermore, the word strap is not limited to relatively thin and flat structures traditionally regarded as straps. Rather the meaning of strap as used herein also specifically includes rope, metal cable, and metal chain links.

Mounting loops 110 are optional because the carrier loops 102 can also function as points of engagement for mounting structures like hooks 150. However, it may be beneficial to include mounting loops 110 so that a greater portion of the tool carrier can be dedicated to carrying tools rather than mounting the tool carrier. Furthermore, adjacent carrier loops 102 and/or mounting loops 110 may share a joint 108 or may each have their own dedicated joints 108, effectively creating a double joint 108. A double joint may be preferred in embodiments designed for bearing relatively heavy tools, as the double joint provides extra strength and durability. However, double joints are not a requirement of the invention.

Figure 3:
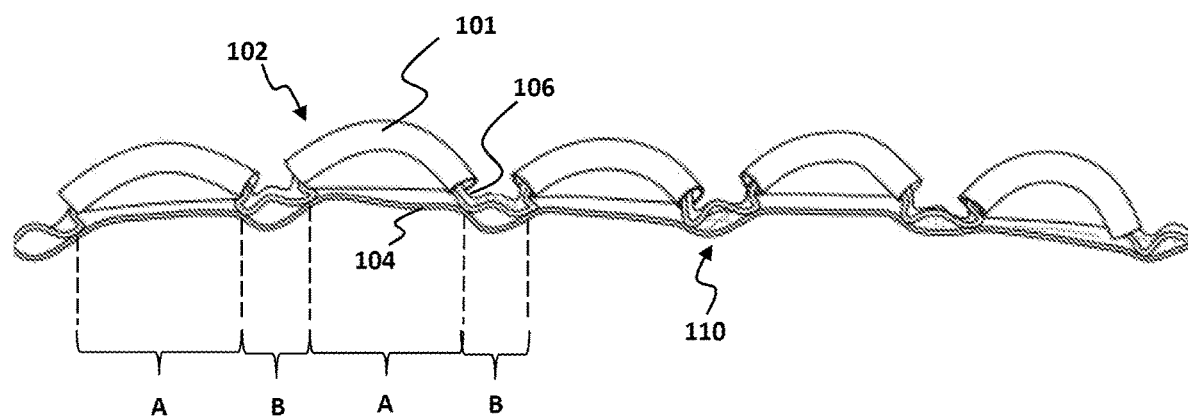
FIG. 3 is a view of a section of the embodiment in FIG. 2 bounded by Box B.

FIG. 3 is a magnified view of the portion of the embodiment 100 enclosed in dashed box 3 of FIG. 2. This magnified view illustrates the carrier loops 102 and mounting loops 110 in greater detail. Regarding carrier loops 102, an attachment arc 101 is shown in the form of a sleeve overlaying the loop strap 106. The attachment arc can be integrated into the carrier loop by, for instance, forming a first joint 108 between the base and loop straps, threading the loop strap through the attachment arc, and forming a second joint 108 closing the carrier loop 102. The attachment arc illustrated here can be fabricated from sections of tubing. Accordingly, the attachment arc is disposed lengthwise along the section of loop strap.

The function of the attachment arc is to allow the loop strap 106 to maintain an open form while a tool is being attached without the user having to hold the loop strap 106 open. For example, a common mode of attaching a tool is through a carabineer. The user would slap the gate of the carabineer against the carrier loop 102 to engage the tool carrier. The loop strap 106 by itself, being comprised of flexible woven fabric webbing, is not sufficiently rigid to hold its form. Rather, it would collapse when struck by the carabineer, making it cumbersome to attach, and possibly even requiring one hand to hold open the loop strap 106 while using the other hand to attach the carabineer. Therefore, the carrier loop is advantageously held open by the attachment arc 101 with sufficient stiffness to maintain its shape during the attachment process.

The person having ordinary skill in the art will be able to select an appropriate tubing material as a matter of design choice; however, non-limiting examples of appropriate materials include vinyl tubing, rubber tubing, or even metal tubing. One advantage of using flexible polymer tubing is its ease of use. By cutting the tubing slightly shorter than the loop strap, but longer than the base strap 104, it naturally forms an arc. Alternatively, metal tubing can be formed to an arc and integrated into the carrier loop 102. Additionally, rather than tubing, the carrier loops can be fabricated by impregnating sections of the loop strap 106 with molten polymer or uncured polymer, which is then hardened or cured to form a semi-rigid, resilient, structure having the sufficiently open shape. In still other embodiments, a resilient strip of polymer or metal can be integrated with the nylon webbing according to known means to provide the necessary stiffness. For example, and without limitation, a strip of resilient material may be sewn, riveted, adhesively bonded, or welded to the loop strap 106. In still other embodiments, one or more metal wires may be integrated into the loop strap 106 for instance, by sewing them into a seam of the loop strap. Some embodiments may integrate a single continuous resilient strip and/or wire along the length of the tool carrier.

While the term "arc" is used herein to describe the shape of the carrier loop, the person having ordinary skill will readily understand that the functionality of the carrier loop 102 does not require a particular shape. Rather, any shape that provides the user with a sufficiently open and resilient attachment point for tools is suitable. The term sufficiently open means that the base strap 104 and loop strap 106 are spaced apart enough to attach tools with one hand, and without having to hold open the carrier loop with a second hand.

The mounting loops 110 may or may not incorporate a resilient member to hold the mounting loop 110 in an open form. It may be convenient to include a resilient member to simplify fabrication e.g., where a single continuous strip or wire is used to form the carrier loops 102. Use of the mounting loops is generally limited to initial setup when the tool carrier is being attached to a structure such as an aerial man basket. It is contemplated that the user will have both hands free while focused on setting up the tool carrier, and the user will not be required to interact with the mounting loops 110 again until he is ready to stow the tool carrier. Therefore, some embodiments may omit a resilient member without departing from the scope of the invention.

Figure 4A:
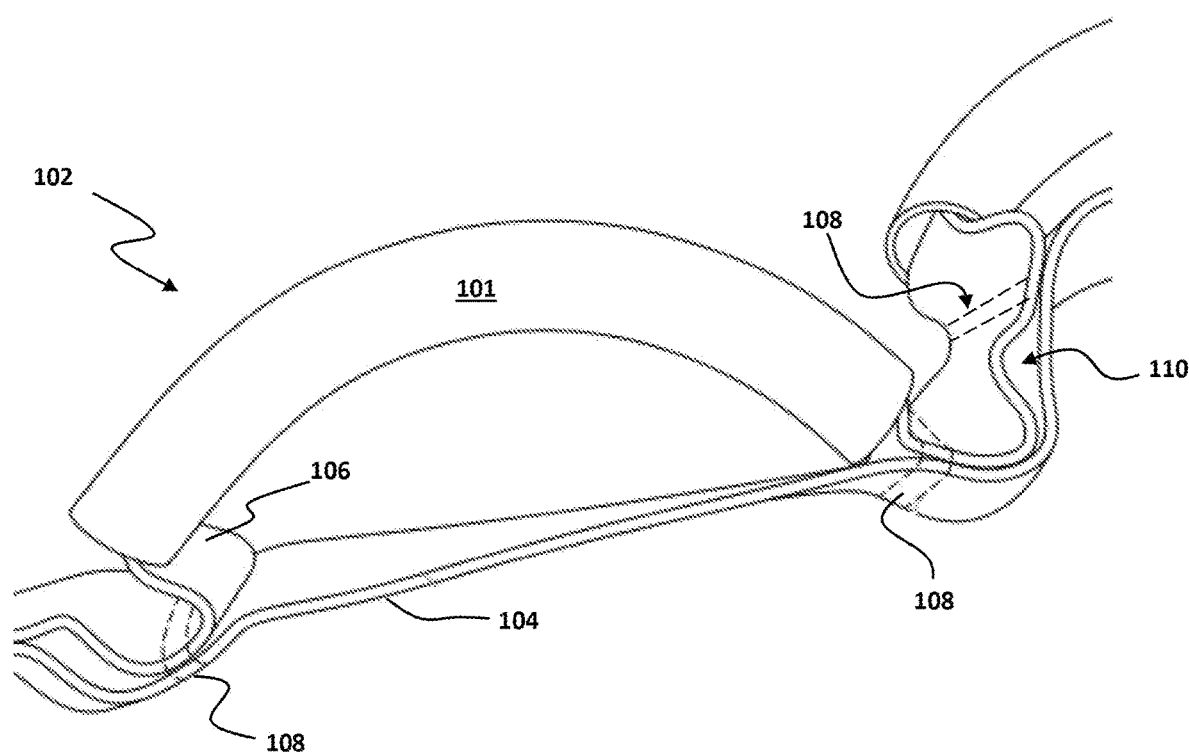
FIG. 4A is a close up perspective view of a mounting loop according to one embodiment.
Figure 4B:
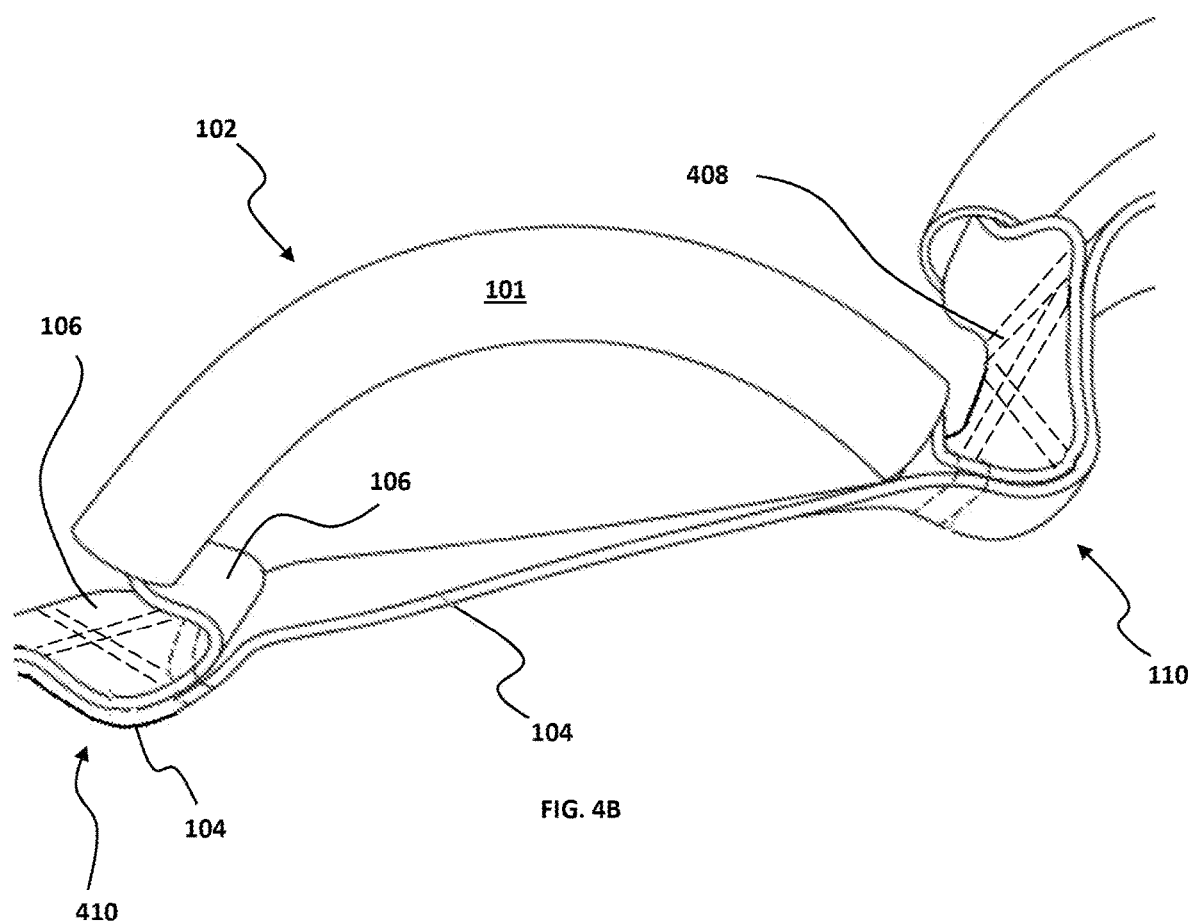
FIG. 4B is a close up perspective view of a mounting loop according to one embodiment.

Turning to FIGS. 4A through 4D, several alternative forms of the mounting loop 110 are provided. For instance, in FIG. 4A the mounting loop 110 is composed of a section of loop strap 106 and a section of base strap 104 joined together according to interval B (see FIG. 3). The section of loop strap 106 may be longer than the section of base strap; however this is not a requirement. Since the use can interact with the mounting loop 110 with two hands all that is required is that the distance between the joints 108 is great enough to receive a mounting structure such as a hook 150. FIG. 4B illustrates an embodiment where the mounting loop 110 lacks an opening between the loop strap 106 and the base strap 104. Rather, the loop strap and base strap are joined across the entire mounting loop. The joint 408 according to this embodiment is made by means similar to that of joint 108 but the joint 408 is larger and stronger. This mounting loop structure is used by hooking a mounting structure such as an S-hook or carabineer around both the loop strap and base strap.

Figure 4C:
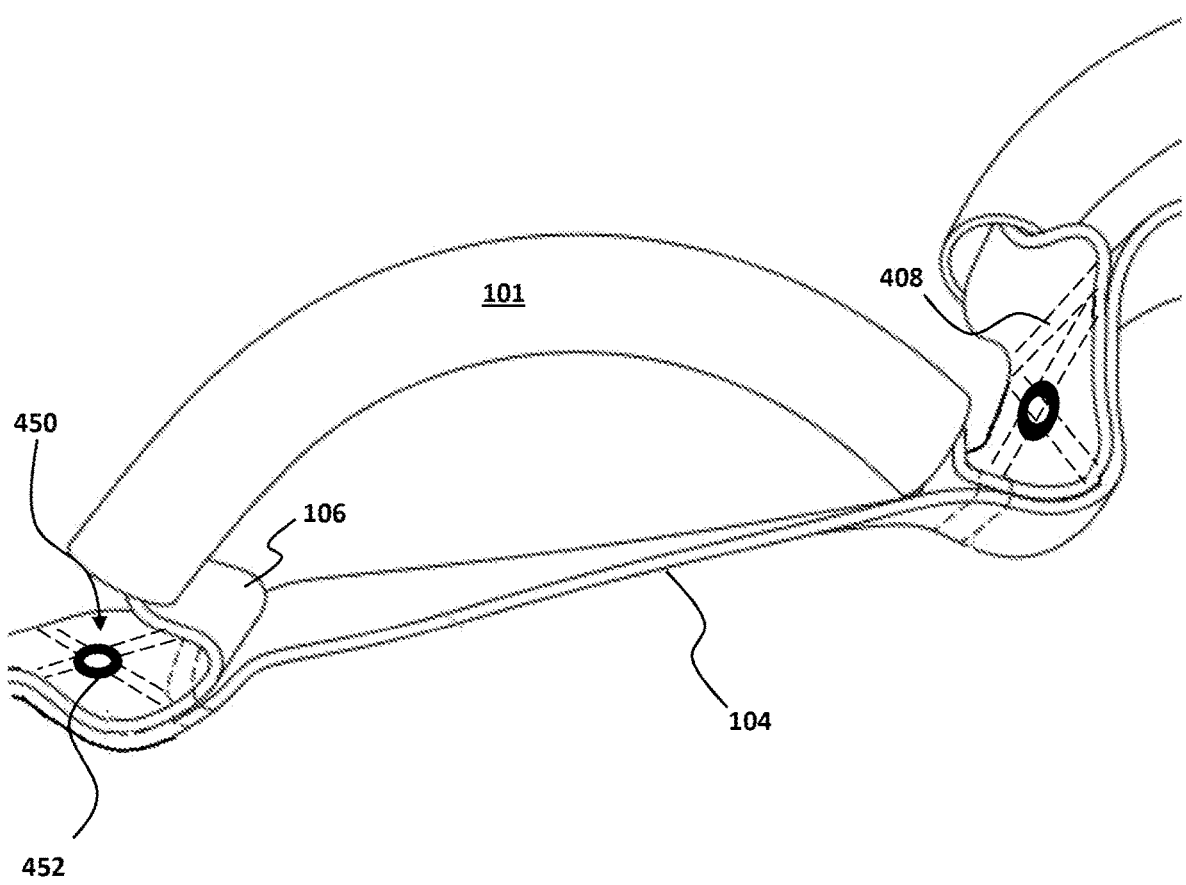
FIG. 4C is a close up perspective view of a mounting loop according to one embodiment.
Figure 4D:
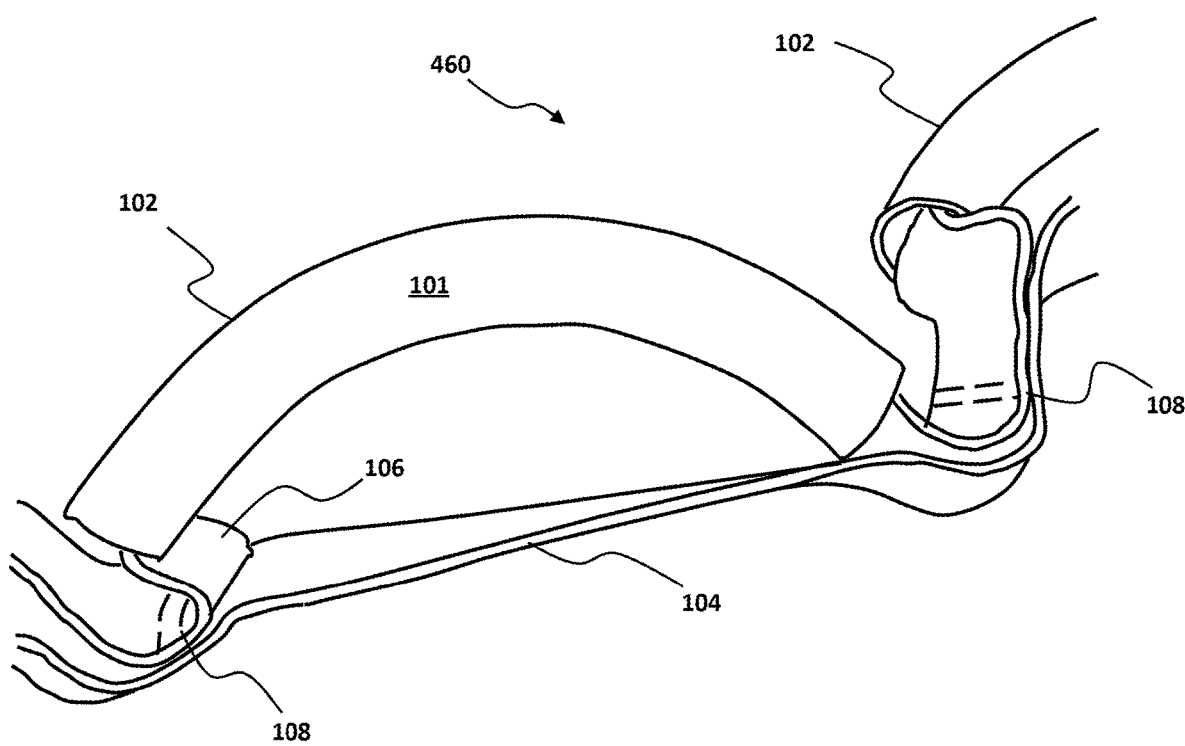
FIG. 4D is a close up perspective view an embodiment lacking mounting loops.

The embodiment of FIG. 4C is similar to that of 4B but further includes an aperture 450 comprising a grommet 452 bounding its inside diameter. The mounting loop 110 is thus adapted to receive a mounting structure, such as a hook, through the aperture 450. FIG. 4D illustrates and embodiment lacking any mounting loop at all. In this embodiment 460 the carrier loops 102 are contiguous, sharing a common stitching joint 108.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

Having thus described the invention, it is now claimed:

I claim:

1. A tool carrier rigging (100), comprising:
   a base strap (104) having a length;
   a loop strap (106) joined to the base strap at a plurality of joints (108) spaced apart at a first regular interval (A) along the base strap (104);
   a carrier loop (102) comprising a section of the base strap (104) and a section of the loop strap (106) joined to the section of the base strap (104) at two of the plurality of joints (108) spaced apart according to the first regular interval (A); and
   a tensioning closure (116) reversibly joining a first end (112) of the tool carrier rigging (100) and a second end (114) of the tool carrier rigging (100).

2. The tool carrier rigging (100) of claim 1, wherein a length of the loop strap (106) between two of the plurality of joints (108) is greater than a corresponding length of the base strap (104) between the same two of the plurality of joints (108).

3. The tool carrier rigging (100) of claim 1, wherein the carrier loop (102) further comprises an attachment arc (101) having a length and a width, the attachment arc (101) being disposed lengthwise along the section of the loop strap (106), wherein the length of the attachment arc is greater than the length of the section of the base strap (104).

4. The tool carrier rigging (100) of claim 3, wherein the length of the attachment arc is less than the length of the section of the loop strap (106).

5. The tool carrier rigging (100) of claim 1, wherein the first regular interval (A) comprises a series of the carrier loops (102).

6. The tool carrier rigging (100) of claim 5, wherein the series of carrier loops (102) is a contiguous series (460) of carrier loops (102), wherein each carrier loop in the series is bounded at both ends by a respective joint (108) of the plurality of joints of the loop strap (106) and the base strap (104).

7. The tool carrier rigging (100) of claim 1, wherein the carrier loops (102) are spaced apart by a second regular interval (B), the second regular interval being bounded by adjacent joints (108) of the plurality of joints of the loop strap (106) and the base strap (104).

8. The tool carrier rigging (100) of claim 7, wherein the second regular interval is comprised of a second section of loop strap (106) and a second section of base strap (104) defining a mounting loop (110) adapted to receive a mounting structure.

9. The tool carrier rigging (100) of claim 7, wherein the second regular interval (B) comprises a second section of the loop strap (106), and a second section of the base strap (104).

10. The tool carrier rigging (100) of claim 9, wherein the second section of the loop strap (106), and the second section of the base strap (104) are joined into a single section of strapping (410).

11. The tool carrier rigging (100) of claim 10, further comprising an aperture (450) through the single section of strapping, wherein the aperture (450) includes a grommet (452) bounding an inside diameter of the aperture (450) to receive a mounting structure.

12. The tool carrier rigging of claim 7, wherein the loop strap (106) is a single continuous loop strap.

13. The tool carrier rigging of claim 12, wherein the loop strap is slackened along the second interval forming a mounting loop (110) adapted to receive a mounting structure.

14. The tool carrier rigging of claim 1, wherein the tensioning closure is a ratcheting closure.

15. The tool carrier rigging of claim 1, wherein the tensioning closure is an assembly of a closure component and a tensioning component.

16. The tool carrier rigging of claim 15, wherein the closure component is a male-female buckle, and the tensioning component is a slide bar or ratchet.

* * * * *